US012780227B2

(12) United States Patent
Bowen et al.

(10) Patent No.: US 12,780,227 B2
(45) Date of Patent: Nov. 3, 2026

(54) REDUNDANT PARK BRAKE CONTROL

(71) Applicant: Textron Inc., Providence, RI (US)

(72) Inventors: Jonathan Daniel Bowen, North Augusta, SC (US); Russell William King, Evans, GA (US); Gregory August Theodosakis, Martinez, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 154 days.

(21) Appl. No.: 18/778,463

(22) Filed: Jul. 19, 2024

(65) Prior Publication Data

US 2026/0021820 A1 Jan. 22, 2026

(51) Int. Cl.

| | |
|---|---|
| ***B60W 50/02*** | (2012.01) |
| ***B60W 10/08*** | (2006.01) |
| ***B60W 10/18*** | (2012.01) |
| ***B60W 10/26*** | (2006.01) |

(52) U.S. Cl.

CPC ........ *B60W 50/0225* (2013.01); *B60W 10/08* (2013.01); *B60W 10/182* (2013.01); *B60W 10/26* (2013.01); *B60W 50/0205* (2013.01); *B60T 2270/402* (2013.01); *B60T 2270/413* (2013.01)

(58) Field of Classification Search

CPC ........ B60T 2270/402; B60T 2270/413; B60W 10/08; B60W 10/182; B60W 10/26; B60W 50/0205; B60W 50/0225

See application file for complete search history.

(56) References Cited

U.S. PATENT DOCUMENTS

| | | | |
|---|---|---|---|
| 5,696,679 | A | 12/1997 | Marshall et al. |
| 6,203,116 | B1 | 3/2001 | Dieckmann |
| 6,256,568 | B1 | 7/2001 | Siepker et al. |
| 6,582,030 | B2 | 6/2003 | Harris |
| 6,702,405 | B1 | 3/2004 | Balz et al. |
| 6,709,069 | B2 | 3/2004 | Riddiford et al. |
| 7,121,633 | B2 | 10/2006 | Tachiiri et al. |
| 7,359,786 | B2 | 4/2008 | Lindqvist |
| 7,721,853 | B2 | 5/2010 | Chittka |
| 7,837,278 | B2 | 11/2010 | Nilsson |
| 8,215,725 | B2 | 7/2012 | Jackson et al. |
| 8,746,419 | B2 | 6/2014 | Roll et al. |
| 8,752,908 | B2 | 6/2014 | Heise |
| 9,022,488 | B2 | 5/2015 | Beier et al. |
| 9,120,477 | B2 | 9/2015 | Febrer et al. |
| 9,302,656 | B2 | 4/2016 | Koth et al. |
| 10,538,225 | B2 | 1/2020 | Mannherz et al. |

(Continued)

*Primary Examiner* — Jerrod Irvin Davis

(74) *Attorney, Agent, or Firm* — Foley & Lardner LLP

(57) ABSTRACT

A golf vehicle includes a parking brake, a first controller, and a second controller. The parking brake is moveable between a braking position and a non-braking position. The parking brake is biased toward the braking position. The first controller is in communication with the parking brake. The second controller is in communication with the first controller and the parking brake. The first controller is configured to selectively control movement of the parking brake between the braking position and the non-braking position. The second controller is configured to, upon detecting that the first controller is malfunctioning, perform a braking operation using the parking brake.

20 Claims, 4 Drawing Sheets

(56) References Cited

U.S. PATENT DOCUMENTS 11,305,747 B1 * 4/2022 Lee .......................... B60T 13/662
2002/0113488 A1 8/2002 Harris
2003/0006726 A1 1/2003 Weiberle et al.
2004/0140710 A1 7/2004 Alvarez et al.
2010/0217488 A1 8/2010 Nijakowski et al.
2010/0294602 A1 11/2010 Gustafsson et al.
2010/0299035 A1 11/2010 Maron et al.
2010/0314934 A1 12/2010 Leiter
2011/0004386 A1 1/2011 Kinder et al.
2011/0172866 A1 7/2011 Doerr et al.
2011/0202246 A1 8/2011 Lindsay et al.
2013/0025951 A1 1/2013 Hilberer
2013/0282249 A1 10/2013 Heise et al.
2015/0134199 A1 * 5/2015 Fraser-Chanpong .......................... B60W 10/00 701/36
2015/0224969 A1 * 8/2015 Huennekens ........... B60T 17/22 701/70
2015/0291135 A1 10/2015 Vernacchia et al.
2016/0009257 A1 1/2016 Joyce et al.
2016/0304067 A1 10/2016 Gajulapalli et al.
2017/0341634 A1 11/2017 Heise
2018/0345931 A1 12/2018 Harries et al.
2019/0193707 A1 6/2019 Deljosevic et al.
2020/0023823 A1 1/2020 Baehrle-Miller et al.
2020/0055506 A1 2/2020 Michels et al.
2020/0070788 A1 * 3/2020 Michels .................. B60T 7/085
2020/0361428 A1 11/2020 Blumentritt et al.
2021/0261161 A1 8/2021 Schlimme
2021/0277995 A1 9/2021 Hutchins et al.
2021/0291799 A1 * 9/2021 Kubik ..................... B60T 8/885
2022/0314953 A1 10/2022 Brok et al.
2022/0340114 A1 10/2022 Marx et al.
2022/0388487 A1 12/2022 Hwang
2022/0410857 A1 12/2022 Li et al.
2023/0126121 A1 4/2023 Brenn et al.
2023/0136605 A1 5/2023 Oosthoek et al.
2023/0249660 A1 * 8/2023 Zhang ................... B60T 13/746
2023/0294650 A1 9/2023 Brenn et al.
2023/0303063 A1 9/2023 Marx et al.
2024/0198989 A1 * 6/2024 Brinkley ................. B60T 7/122
2024/0317198 A1 * 9/2024 King ....................... B60T 8/171

* cited by examiner

REDUNDANT PARK BRAKE CONTROL

BACKGROUND

Many off-road machines and other vehicles include parking brakes. For example, golf carts, all-terrain vehicles, utility task vehicles, low speed vehicles, and/or other types of lightweight or recreational machines and/or vehicles may include electromagnetic parking brakes. In some embodiments, electromagnetic brakes used in these types of vehicles may be biased toward a braking position. That is, when the electromagnetic brakes are energized (e.g., the electromagnetic brakes have power delivered to them), the brakes are moved into a non-braking position, and when the electromagnetic brakes are not energized (e.g., the electromagnetic brakes do not have power delivered to them), the brakes are returned (e.g., via a spring or other biasing mechanism) to a braking position.

SUMMARY

One embodiment relates to a golf vehicle. The golf vehicle includes a parking brake, a first controller, and a second controller. The parking brake is moveable between a braking position and a non-braking position. The parking brake is biased toward the braking position. The first controller is in communication with the parking brake. The second controller is in communication with the first controller and the parking brake. The first controller is configured to selectively control movement of the parking brake between the braking position and the non-braking position. The second controller is configured to, upon detecting that the first controller is malfunctioning, perform a braking operation using the parking brake.

Another embodiment relates to a golf vehicle. The golf vehicle includes a parking brake, a first controller, and a second controller. The parking brake is moveable between a braking position and a non-braking position. The first controller is in communication with the parking brake. The second controller is in communication with the parking brake and the first controller. The second controller includes at least one processing circuit having at least one processor and at least one memory. The at least one memory stores instructions thereon that, when executed by the at least one processor, cause the at least one processor to determine that the first controller indicates that the parking brake should move from the non-braking position to the braking position while the golf vehicle is being driven. The instructions further cause the at least one processor to determine that the first controller is malfunctioning. The instructions further cause the at least one processor to, in response to determining that the first controller is malfunctioning, take control of the parking brake.

Still another embodiment relates to a vehicle. The vehicle includes a parking brake, a motor, a motor controller, a battery system, and a battery management system. The parking brake is moveable between a braking position and a non-braking position. The parking brake is biased toward the braking position. The motor is configured to propel the vehicle. The motor controller is in communication with the motor and the parking brake. The battery system includes one or more batteries configured to power the parking brake and the motor. The battery management system is in communication with the parking brake, the motor controller, and the battery system. The battery management system is configured to determine that the motor controller is malfunctioning. The battery management system is further configured to, in response to determining that the motor controller is malfunctioning, perform a braking operation using the parking brake.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
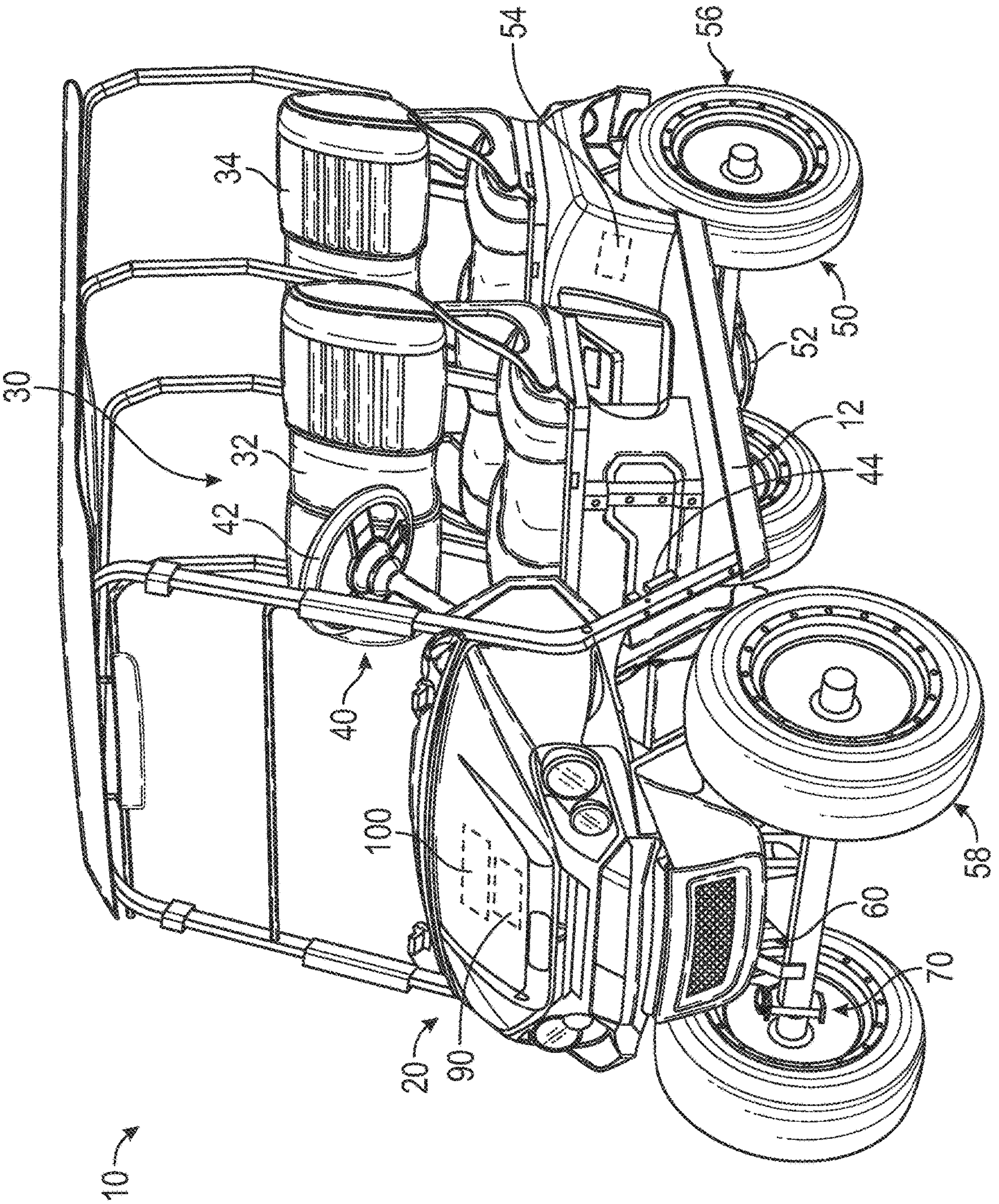
FIG. 1 is a perspective view of a vehicle, according to an exemplary embodiment.
Figure 2:
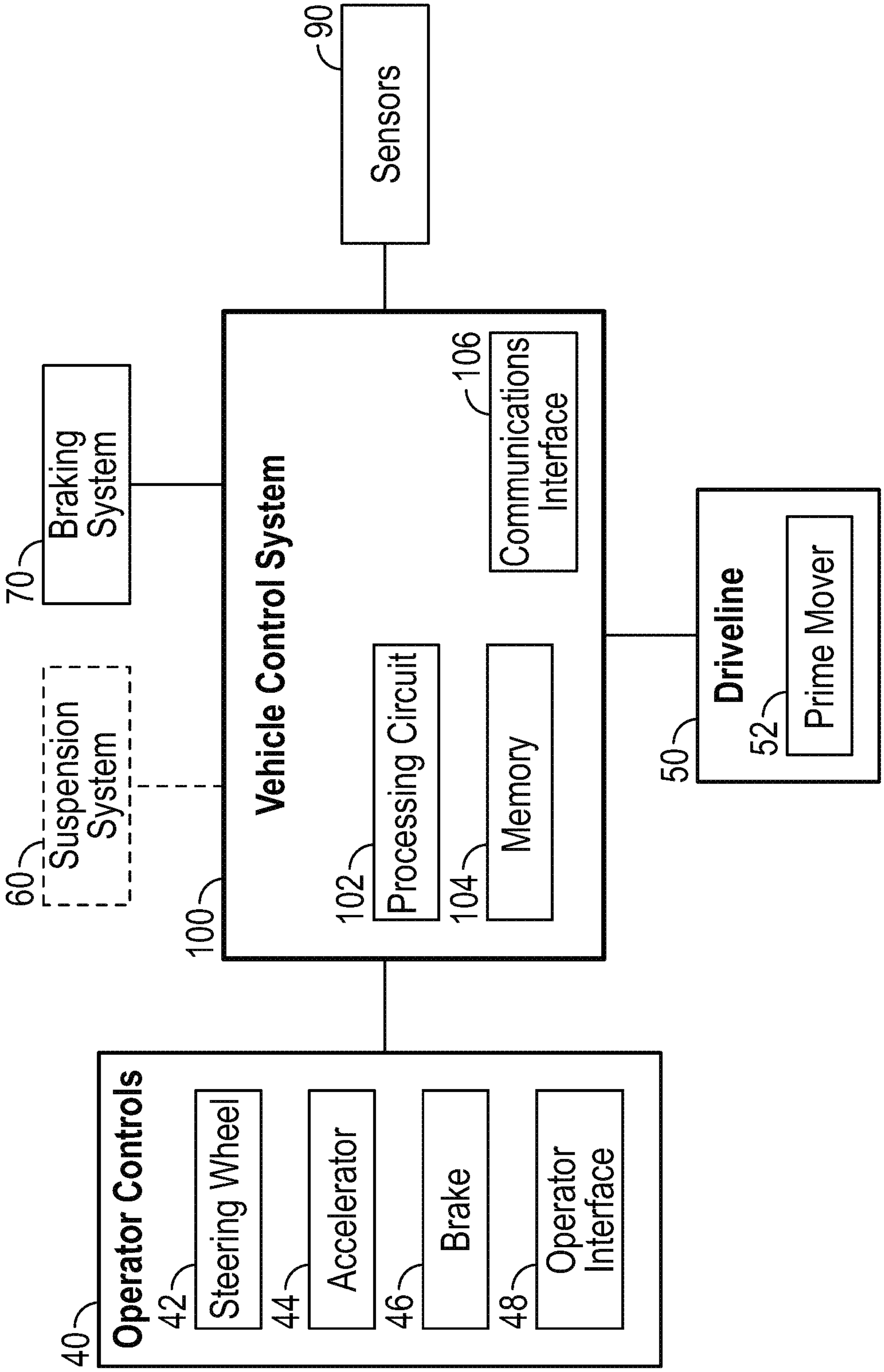
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), a low-speed vehicle ("LSV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the braking system 70 may utilize, solely or in combination with other braking components, regenerative braking (e.g., via an electric motor or prime mover 52 of the vehicle 10).

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Vehicle Control System

Figure 3:
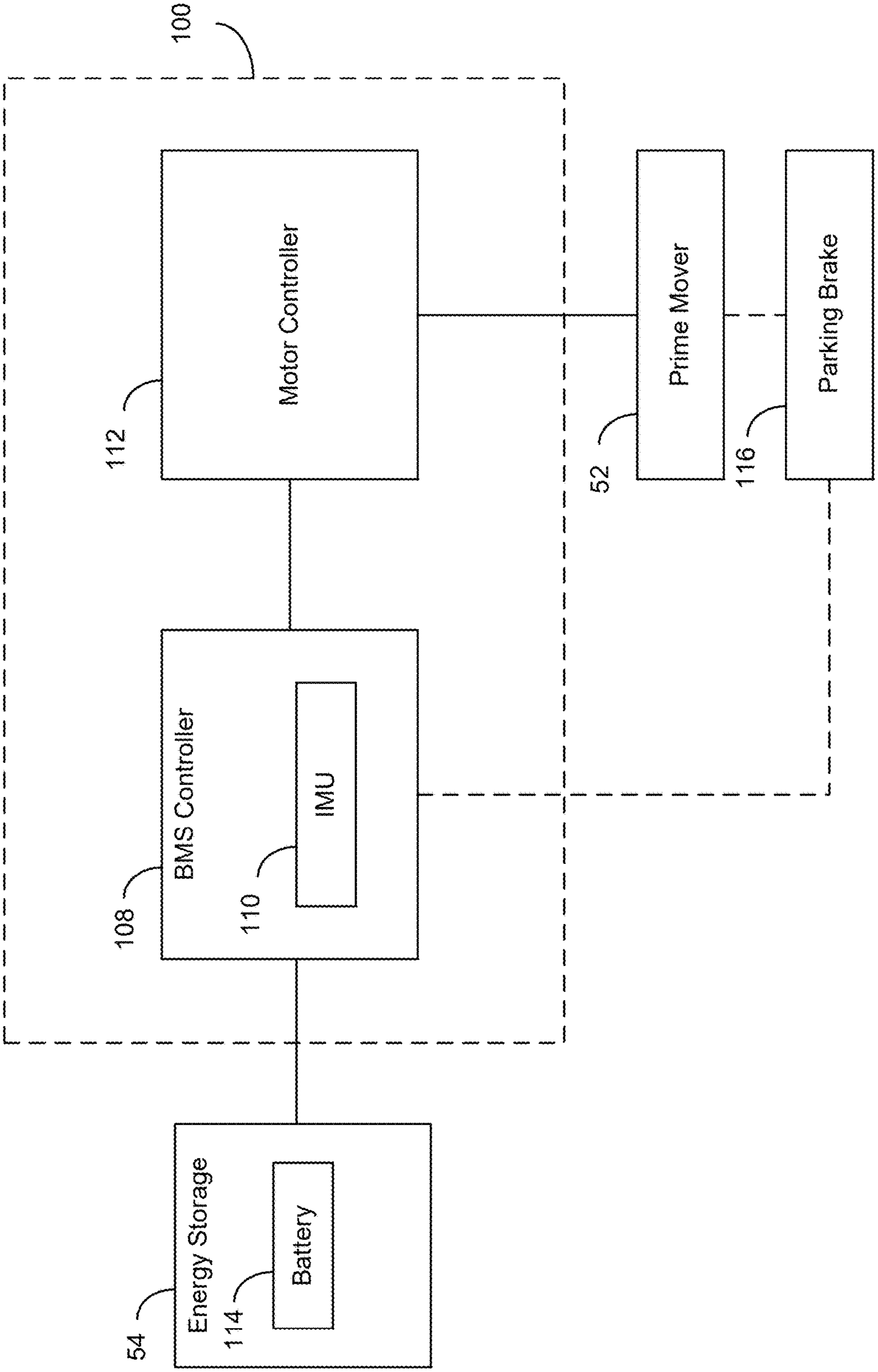
FIG. 3 is a block diagram of a vehicle control system of the vehicle of FIG. 1, according to an exemplary embodiment.

Referring to FIG. 3, a more detailed block diagram of the vehicle control system 100 is shown, according to an exemplary embodiment. As shown in FIG. 3, the vehicle control system 100 includes (a) a battery management system (BMS), shown as BMS controller 108, having an internal IMU, shown as IMU 110, and (b) a motor controller, shown as motor controller 112. In other embodiments, the IMU 110 is separate from the BMS controller 108 (e.g., a separate component, part of the motor controller 112, etc.). The BMS controller 108 and/or the motor controller 112 may include a processing circuit, a memory, and a communications interface similar to the processing circuit 102, the memory 104, and communications interface 106. In some instances, the BMS controller 108 or the motor controller 112 may be considered or referred to herein as a "first" controller and the other of the BMS controller 108 or the motor controller 112 may be considered or referred to herein as a "second" controller.

As shown in FIG. 3, (a) the BMS controller 108 is coupled or in communication with a battery system, pack, or bank, shown as battery 114, of the energy storage 54, (b) the motor controller 112 is coupled or in communication with the prime mover 52 and, in some instances, an electronic braking mechanism thereof, shown as parking brake 116 (as represented by the dashed line connecting the prime mover 52 to the parking brake 116), and (c) the BMS controller 108 and motor controller 112 are coupled or in communication with one another. In some embodiments, the parking brake 116 is an electromagnetic brake that is moveable between a braking position, in which the parking brake 116 applies braking to one or more components of the driveline 50, and a non-braking position, in which the parking brake 116 does not apply braking to the one or more components of the driveline 50. In some embodiments, the parking brake 116 is biased toward the braking position via a spring, a magnet, or other biasing mechanism. That is, when the parking brake 116 is energized (e.g., the parking brake 116 has power delivered to it from the battery 114), the parking brake 116 is moved into the non-braking position, and when the parking brake 116 is not energized (e.g., the parking brake 116 does not have power delivered to it from the battery 114), the parking brake 116 is returned or biased (e.g., via the spring or other biasing mechanism) to the braking position.

In some embodiments, instead of or in addition to the motor controller 112 being directly coupled with the parking brake 116, the BMS controller 108 is coupled with or in communication with the parking brake 116. Accordingly, in some embodiments, the parking brake 116 is controlled (e.g., moved between a braking position and a non-braking position) by (a) the motor controller 112 directly, (b) the motor controller 112 and the BMS controller 108 in series (e.g., the motor controller 112 sending control signals to the BMS controller 108 to be used to control the parking brake 116), (c) by the BMS controller 108 and the motor controller 112 in parallel, or (d) by the BMS controller 108 directly, as will be described below with respect to FIG. 5.

In some embodiments, the BMS controller 108 and/or IMU 110 are disposed within a housing of the energy storage 54 holding the battery 114 (e.g., inside of the housing of a battery pack). In this way, the BMS controller 108 and the IMU 110 may be a part of the energy storage 54 and be powered by direct wiring to the battery 114. In other embodiments, the IMU 110 is located in or mounted on an external device (e.g., on the chassis or frame 12, inside the dashboard, on suspension components, etc.). In this example, the IMU 110 may be powered by an auxiliary power feed. The auxiliary power feed may be an individual battery pack, a wired connection to the vehicle's electrical system, a solar panel, or anything of the like.

According to an exemplary embodiment, the IMU 110 includes accelerometers, gyroscopes, and/or magnetometers to facilitate detecting movement, vibrations, acceleration, tilt, and/or rotational motion of the vehicle 10. In some embodiments, the IMU 110 is coupled with an onboard camera. In an exemplary embodiment, the data collected by the IMU 110 and/or an onboard camera is utilized by the vehicle control system 100 to determine when an occupant has entered the vehicle 10 and/or whether a person is otherwise manipulating or interacting with the vehicle 10.

Redundant Electromagnetic Brake Control

Figure 4:
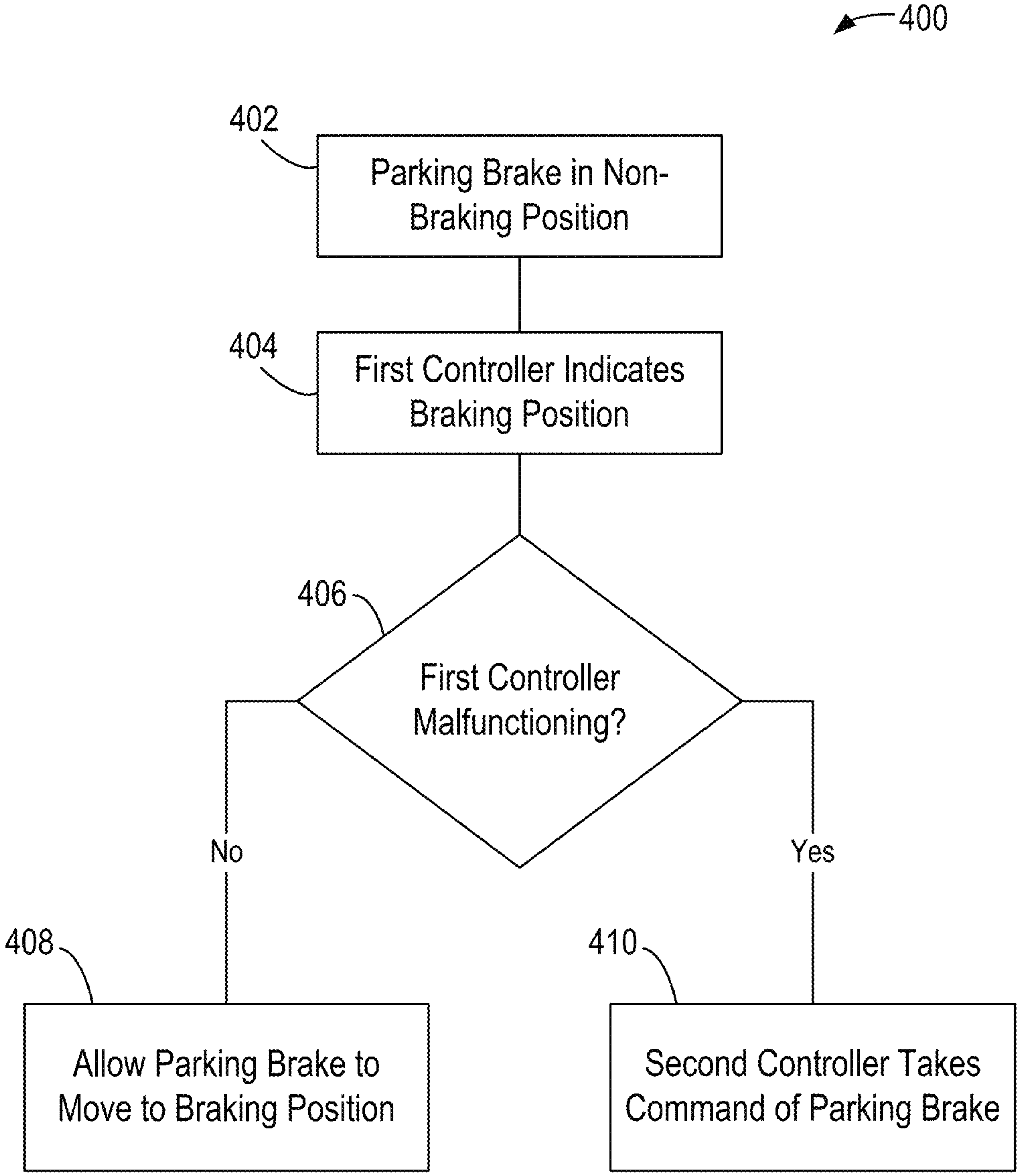
FIG. 4 is a flowchart of a method for redundant brake control, according to an exemplary embodiment.

Referring now to FIG. 4, a method 400 for redundant electromagnetic brake control is shown, according to an exemplary embodiment. It should be appreciated that the following description is provided as an example and is in no way meant to be limiting. Furthermore, it should be appreciated that, in some embodiments, various steps may be added, omitted, and/or rearranged within the method 400 without departing from the scope of the present disclosure. In some embodiments, the method 400 is performed by the BMS controller 108 and the motor controller 112 of the vehicle control system 100. In other embodiments, the method 400 may be performed by various other controllers (e.g., similar to the BMS controller 108 and/or the motor controller 112) configured to control other components or systems of the vehicle 10, as desired for a given application.

As a general overview, the method 400 allows for the vehicle control system 100 to control the parking brake 116 via a first controller (e.g., the motor controller 112) directly or through communication with a second controller (e.g., the BMS controller 108), while preventing the parking brake 116 from erroneously and instantly locking up (e.g., returning directly to the braking position) and abruptly stopping the vehicle 10 while the vehicle 10 is being driven if the first controller malfunctions (e.g., experiences a fault, gets damaged, or otherwise gets inadvertently disconnected) by allowing for the second controller to selectively take control of the parking brake 116. It should be appreciated that, while the following description is provided with reference to the motor controller 112 as the "first controller" and the BMS controller 108 as the "second controller", the method 400 can similarly be implemented using other "first" and "second" controllers, as desired for a given application. Further, while the method 400 is described in the context of certain components of the vehicle 10, the method 400 can similarly be utilized to control other parking brakes of other types of vehicles in a similar manner.

The method 400 begins with the parking brake 116 in the non-braking position, at step 402. For example, while the vehicle 10 is being driven, the motor controller 112 (e.g., the "first controller") commands the parking brake 116 to move toward and stay within the non-braking position to allow for the vehicle 10 to continue moving. In some instances, the motor controller 112 may directly control the parking brake 116. In these instances, the BMS controller 108 may continuously deliver power from the battery 114 to the motor controller 112, and the motor controller 112 may selectively deliver that power a coil of the parking brake 116 to electromagnetically move the parking brake 116 into and maintain the parking brake 116 within the non-braking position.

In some other instances, the motor controller 112 may control the parking brake 116 via communication with the BMS controller 108 (e.g., the "second controller"). That is, the motor controller 112 may transmit a control signal (e.g., via a wired or wireless connection) to the BMS controller 108, and the BMS controller 108 may selectively deliver power from the battery 114 directly to the coil of the parking brake 116 to electromagnetically move the parking brake 116 into and maintain the parking brake 116 within the non-braking position based on the control signal received from the motor controller 112. In some instances, as will be described below, the BMS controller 108 may additionally or alternatively directly control the parking brake 116 without, or contrary to, the control signal from the motor controller 112 (e.g., upon detecting that the motor controller 112 malfunctioning).

With the parking brake in the non-braking position (e.g., while the vehicle 10 is being driven), at step 402, the BMS controller 108 (e.g., the "second controller") then determines that the motor controller 112 (e.g., the "first controller") indicates (e.g., transmits a brake signal) that the parking brake 116 should move from the non-braking position to the braking position, at step 404. For example, in some instances, the BMS controller 108 may determine that the motor controller 112 is either (a) directly controlling the parking brake 116 to move into the parking position or (b) indirectly commanding the parking brake 116 to move to the parking position via a control signal sent to the BMS controller 108. In the case that the motor controller 112 is directly controlling the parking brake 116, the motor controller 112 may be configured to continuously provide a parallel notification or parking brake position signal to the BMS controller 108 to communicate the intended position of the parking brake 116.

In some instances, the BMS controller 108 may determine that the motor controller 112 is indicating that the parking brake 116 should move from the non-braking position to the braking position based on the motor controller 112 ceasing delivery of either of the control signal or the parallel notifications to the BMS controller 108. For example, in some instances, to move or maintain the parking brake 116 into or within the non-braking position, the motor controller 112 may continuously (a) apply the control signal indicating that the parking brake 116 should be in the non-braking position to the BMS controller 108 or (b) deliver power from the battery 114 to the coil of the parking brake 116 and simultaneously provide a continuous parallel notification to the BMS controller 108 indicating that the parking brake 116 is being maintained in the non-braking position. Accordingly, upon cessation of the control signal or the parallel notification, the parking brake 116 may be automatically returned to the braking position (e.g., via the biasing of the parking brake 116 toward the braking position) unless the BMS controller 108 intervenes, as will be discussed below.

Upon determining that the motor controller 112 (e.g., the "first controller") indicates that the parking brake 116 should move to the braking position, at step 404, the BMS controller 108 (e.g., the "second controller") then determines whether the motor controller 112 is malfunctioning, at step 406. For example, the motor controller 112 may malfunction in a variety of ways. In some instances, the motor controller 112 may fail, experience a fault, become damaged (e.g., from gradual wear and tear, a collision, water exposure), become disconnected (e.g., due to a collision or a severe jounce event), or otherwise malfunction during operation.

In some instances, the BMS controller 108 is configured to determine that the motor controller 112 is malfunctioning based on a fault signal received by the BMS controller 108 from the motor controller 112. In some other instances, the BMS controller 108 is configured to determine that the motor controller 112 is malfunctioning based on the BMS controller 108 detecting that the motor controller 112 has been disconnected from the BMS controller 108, the parking brake 116, and/or otherwise disconnected or powered down generally.

In some instances, the BMS controller 108 is configured to determine that the motor controller 112 is malfunctioning due to one or more vehicle state rules. For example, the BMS controller 108 may store a vehicle state rule that prohibits the parking brake 116 from being engaged (e.g., moving to the braking position) while the vehicle 10 is moving over a specified vehicle speed (e.g., 0.5 miles per hour, 1 mile per hour, etc.). Accordingly, in some instances, the BMS controller 108 is configured to monitor a speed of the vehicle 10 (e.g., via data captured by the IMU 110) and, if the motor controller 112 indicates that the parking brake 116 should move to the braking position while the vehicle 10 is traveling faster than the specified vehicle speed, the BMS controller 108 may determine that the motor controller 112 is malfunctioning, as will be described below. Similarly, the BMS controller 108 may store one or more additional vehicle state rules corresponding to specified thresholds for other vehicle parameters or inputs (e.g., motor speed, acceleration data) monitored by the BMS controller 108 (e.g., the IMU via communications interface 106 or the CAN bus) to determine whether the motor controller 112 is malfunctioning (e.g., providing an erroneous instruction to move the parking brake 116 to the braking position). In some instances, the BMS controller 108 may utilize independent or multiple determination methodologies in combination to increase an accuracy and/or responsiveness of the BMS controller 108 when determining whether the motor controller 112 is malfunctioning.

If the BMS controller 108 (e.g., the "second controller") determines that the motor controller 112 (e.g., the "first controller") is not malfunctioning, at step 406, the BMS controller 108 allows the parking brake 116 to move to the braking position, at step 408. For example, in some instances, the BMS controller 108 may simply allow the motor controller 112 to continuously control the operation of the parking brake 116 so long as the motor controller 112 is not malfunctioning.

In other some instances, the motor controller 112 may require approval from or a consensus with the BMS controller 108 (or vice versa) before moving or otherwise updating a position of the parking brake 116. For example, prior to changing a state of the parking brake 116 (e.g., moving the parking brake 116 between the braking and non-braking positions), the BMS controller 108 and the motor controller 112 may perform a handshake (e.g., communicate a parking brake action verification to one another) to assure that both controllers are in agreement that the parking brake 116 should be moved from one position to another (e.g., from the non-braking position to the braking position) before the parking brake 116 is moved. For example, in some instances, the BMS controller 108 may receive each of the same inputs as the motor controller 112 and be configured to independently conclude whether the parking brake 116 should be moved into the braking position.

In some instances, in addition or alternative to performing a handshake, the BMS controller 108 and the motor controller 112 may each individually and simultaneously (e.g., in parallel) deliver power from the battery 114 to the coil of the parking brake 116, such that, if the motor controller 112 attempts to de-energize the parking brake 116 (and thus move the parking brake 116 to the parking position) and the BMS controller 108 determines that an expected parking brake state of the parking brake 116 is different than the control indication from the motor controller 112 (e.g., determines that the parking brake 116 should not be moved to the parking position due to one or more vehicle state rules), the BMS controller 108 may continue to energize the parking brake 116 to prevent it from moving to the parking position.

If the BMS controller 108 (e.g., the "second controller") determines that the motor controller 112 (e.g., the "first controller") is malfunctioning, at step 406, the BMS controller 108 takes over control of the parking brake 116, at step 410. For example, in some instances, the BMS controller 108 may override or otherwise overrule any commands from the motor controller 112 upon detection of the malfunctioning motor controller 112. In some other instances, the BMS controller 108 may simply continue to power the parking brake 116 to maintain the parking brake 116 in the non-braking position despite the contrary command or indication from the motor controller 112.

Accordingly, upon the motor controller 112 malfunctioning, the BMS controller 108 is configured to prevent the parking brake 116 from instantly moving to the braking position and abruptly stopping the vehicle 10. In some instances, once the BMS controller 108 has taken control of the parking brake 116, the BMS controller 108 is configured to perform a gradual braking operation to gradually slow the vehicle 10 down to a reduced speed (e.g., a limp mode) and, in some case, a full stop. For example, in some instances, the BMS controller 108 may cause the prime mover 52 (e.g., a motor) and the energy storage 54 (e.g., a battery system) to perform regenerative braking to gradually slow the vehicle 10 down before ultimately allowing the parking brake 116 to move into the braking position. Alternatively or additionally, the BMS controller 108 may cause the parking brake 116 to perform a pulse brake operation by pulsing the parking brake 116 between the braking and non-braking position (as opposed to immediately moving and maintaining the parking brake in the non-braking position) to more gradually slow the vehicle 10 down before ultimately maintaining the parking brake 116 within the braking position. In some embodiments, the BMS controller 108 may additionally or alternatively cause the parking brake 116 to apply a variable braking force. In these instances, the parking brake 116 may be configured for variable braking force by applying varied power from the battery (e.g., the energy storage 54) to the parking brake 116. In some other embodiments, the BMS controller 108 may additionally or alternatively perform a free-roll braking operation in which the vehicle 10 is allowed to freely roll until it gradually slows to a stop, and then the parking brake 116 is locked (e.g., moved into the parking position).

In some instances, upon the motor controller 112 malfunctioning, the BMS controller 108 may additionally be configured to take control of the prime mover 52 and/or any other components that the motor controller 112 was taking control of prior to malfunctioning. That is, in some instances, the BMS controller 108 may be configured to store backup operating instructions associated with the motor controller 112 and, upon detecting that the motor controller 112 has malfunctioned, the BMS controller 108 may be configured to perform the functionality of the motor controller 112 in addition to the functionality of the BMS controller 108 until the motor controller 112 can be repaired or replaced.

Accordingly, the systems and methods described herein allow for two vehicle controllers (e.g., the BMS controller 108 and the motor controller 112) to function together, in series or in parallel, to control operation of the parking brake 116, thereby providing redundancy against a malfunction of a first or primary controller (e.g., the motor controller 112) by allowing a second controller (e.g., the BMS controller 108) to at least temporarily take command of the parking brake 116.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) as shown in the various exemplary embodiments is illustrative only. Additionally, any element disclosed in one embodiment may be incorporated or utilized with any other embodiment disclosed herein.

The invention claimed is:

1. A golf vehicle comprising:

a parking brake moveable between a braking position and a non-braking position, the parking brake biased toward the braking position;

a first controller in communication with the parking brake and configured to selectively control movement of the parking brake between the braking position and the non-braking position; and a second controller in communication with the first controller and the parking brake and configured to:

determine an expected parking brake state based on a vehicle state rule;

detect that the first controller is malfunctioning based on a control signal of the first controller conflicting with the expected parking brake state; and upon detecting that the first controller is malfunctioning, perform a braking operation using the parking brake.

2. The golf vehicle of claim 1, wherein the braking operation includes one of a pulsed braking operation that transitions the parking brake back and forth between the braking position and the non-braking position or a free-roll braking operation in which the golf vehicle is allowed to gradually roll to a stop before the parking brake is moved to the braking position.

3. The golf vehicle of claim 1, further comprising a prime mover, wherein the first controller is a prime mover controller that is further configured to control the prime mover.

4. The golf vehicle of claim 3, wherein the prime mover includes an electric motor.

5. The golf vehicle of claim 4, further comprising a battery system, wherein the second controller is a battery management system that is further configured to control the battery system.

6. The golf vehicle of claim 1, wherein the first controller and the second controller are configured to control the parking brake in parallel.

7. The golf vehicle of claim 1, wherein the first controller and the second controller are configured to control the parking brake in series.

8. The golf vehicle of claim 1, wherein the parking brake is an electromagnetic parking brake.

9. The golf vehicle of claim 1, wherein the vehicle state rule based on a speed of the golf vehicle.

10. The golf vehicle of claim 9, wherein the vehicle state rule prohibits the parking brake from moving to the braking position while the golf vehicle is moving over a specified vehicle speed.

11. The golf vehicle of claim 1, wherein the vehicle state rule is based on one of a motor speed or an acceleration of the golf vehicle.

12. A golf vehicle comprising:

a parking brake moveable between a braking position and a non-braking position;

a first controller in communication with the parking brake; and a second controller in communication with the parking brake and the first controller, the second controller including at least one processing circuit having at least one processor and at least one memory, the at least one memory storing instructions thereon that, when executed by the at least one processor, cause the at least one processor to:

determine that the first controller indicates that the parking brake should move from the non-braking position to the braking position while the golf vehicle is being driven;

determine that an expected parking brake state is the non-braking position based on a vehicle state rule;

determine that the first controller is malfunctioning based on the first controller indicating that the parking brake should move from the non-braking position to the braking position while the golf vehicle is being driven and the expected parking brake state being the non-braking position; and in response to determining that the first controller is malfunctioning, take control of the parking brake.

13. The golf vehicle of claim 12, wherein the parking brake is biased toward the braking position.

14. The golf vehicle of claim 12, wherein taking control of the parking brake includes performing a pulsed braking operation that transitions the parking brake back and forth between the braking position and the non-braking position.

15. The golf vehicle of claim 12, wherein determining that the first controller is malfunctioning is based on at least one of (a) a fault signal received by the second controller from the first controller or (b) the second controller detecting that the first controller has been disconnected therefrom.

16. The golf vehicle of claim 12, further comprising a motor and a battery system, and wherein the first controller is a motor controller that is further configured to control the motor and the second controller is a battery management system that is further configured to control the battery system.

17. The golf vehicle of claim 12, wherein determining that the first controller indicates that the parking brake should move from the non-braking position to the braking position is based on (a) the first controller ceasing delivery of a control signal to the second controller or (b) ceasing delivery of a continuous notification to the second controller indicating that the first controller is maintaining the parking brake in the non-braking position.

18. A vehicle comprising:

a parking brake moveable between a braking position and a non-braking position, the parking brake biased toward the braking position;

a motor configured to propel the vehicle;

a motor controller in communication with the motor and the parking brake;

a battery system including one or more batteries configured to power the parking brake and the motor; and a battery management system in communication with the parking brake, the motor controller, and the battery system, the battery management system configured to:

determine an expected parking brake state based on a vehicle state rule;

determine that the motor controller is malfunctioning based on a control signal of the motor controller conflicting with the expected parking brake state; and in response to determining that the motor controller is malfunctioning, perform a braking operation using the parking brake.

19. The vehicle of claim 18, wherein the braking operation is a pulsed braking operation that transitions the parking brake back and forth between the braking position and the non-braking position.

20. The vehicle of claim 18, wherein the parking brake is an electromagnetic parking brake.

* * * * *